W. CASTLES.
MACHINE FOR EXCAVATING, RAISING, AND DUMPING EARTH, &c.
APPLICATION FILED OCT. 20, 1909.

950,367.

Patented Feb. 22, 1910.
7 SHEETS—SHEET 1.

W. CASTLES.
MACHINE FOR EXCAVATING, RAISING, AND DUMPING EARTH, &c.
APPLICATION FILED OCT. 20, 1909.

950,367.

Patented Feb. 22, 1910.
7 SHEETS—SHEET 2.

W. CASTLES.
MACHINE FOR EXCAVATING, RAISING, AND DUMPING EARTH, &c.
APPLICATION FILED OCT. 20, 1909.

950,367.

Patented Feb. 22, 1910.
7 SHEETS—SHEET 5.

Witnesses.

Inventor
Wesley Castles
By
James L. Norris
Atty.

W. CASTLES.
MACHINE FOR EXCAVATING, RAISING, AND DUMPING EARTH, &c.
APPLICATION FILED OCT. 20, 1909.

950,367.

Patented Feb. 22, 1910.
7 SHEETS—SHEET 6.

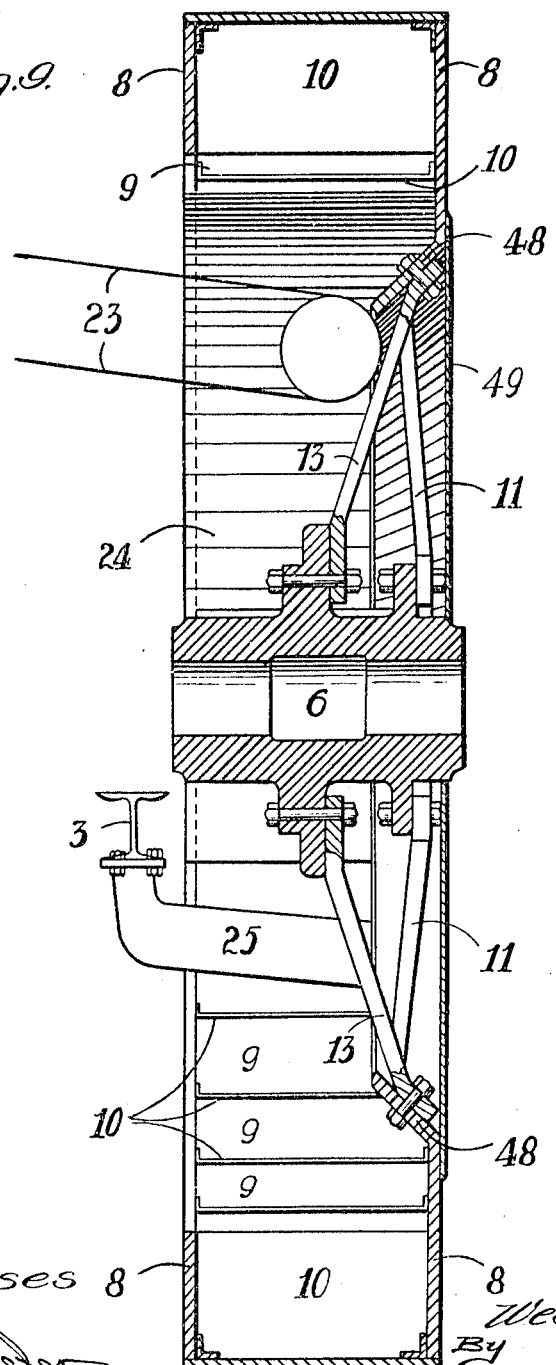

UNITED STATES PATENT OFFICE.

WESLEY CASTLES, OF STANMORE, NEAR SYDNEY, NEW SOUTH WALES, AUSTRALIA.

MACHINE FOR EXCAVATING, RAISING, AND DUMPING EARTH, &c.

950,367.  Specification of Letters Patent.  Patented Feb. 22, 1910.

Application filed October 20, 1909. Serial No. 523,674.

*To all whom it may concern:*

Be it known that I, WESLEY CASTLES, subject of the King of Great Britain, residing at No. 133 Stanmore road, Stanmore, near Sydney, in the State of New South Wales and Commonwealth of Australia, have invented an Improved Machine for Excavating, Raising, and Dumping Earth, Sand, Silt, or Gravel, of which the following is a specification.

This invention relates to an improved machine for excavating, raising and dumping earth, sand, silt or gravel, and has been devised particularly for the purpose of facilitating the construction of canals, channels, dams and similar earth works.

A machine constructed as hereinafter described will have a wide range of adaptability, and can be strongly and economically manufactured in a form which will permit of its ready adjustment to varying working conditions or kinds of soil being treated.

The principal features of the invention comprise a horizontal rectangular framing of channel or other suitable bar iron or tubing having a transversely mounted shaft or axle, the ends of which are fitted within the hubs of combined transport and elevating wheels of novel design; double ended plows for cutting the soil into sods and depositing the latter within the sphere of operation of the said wheels; and elevating earth belts for conveying the excavated earth to a desired point and there dumping it.
In order that the invention may be readily understood, reference will now be made to the accompanying sheets of drawings, wherein:—

Figure 1:
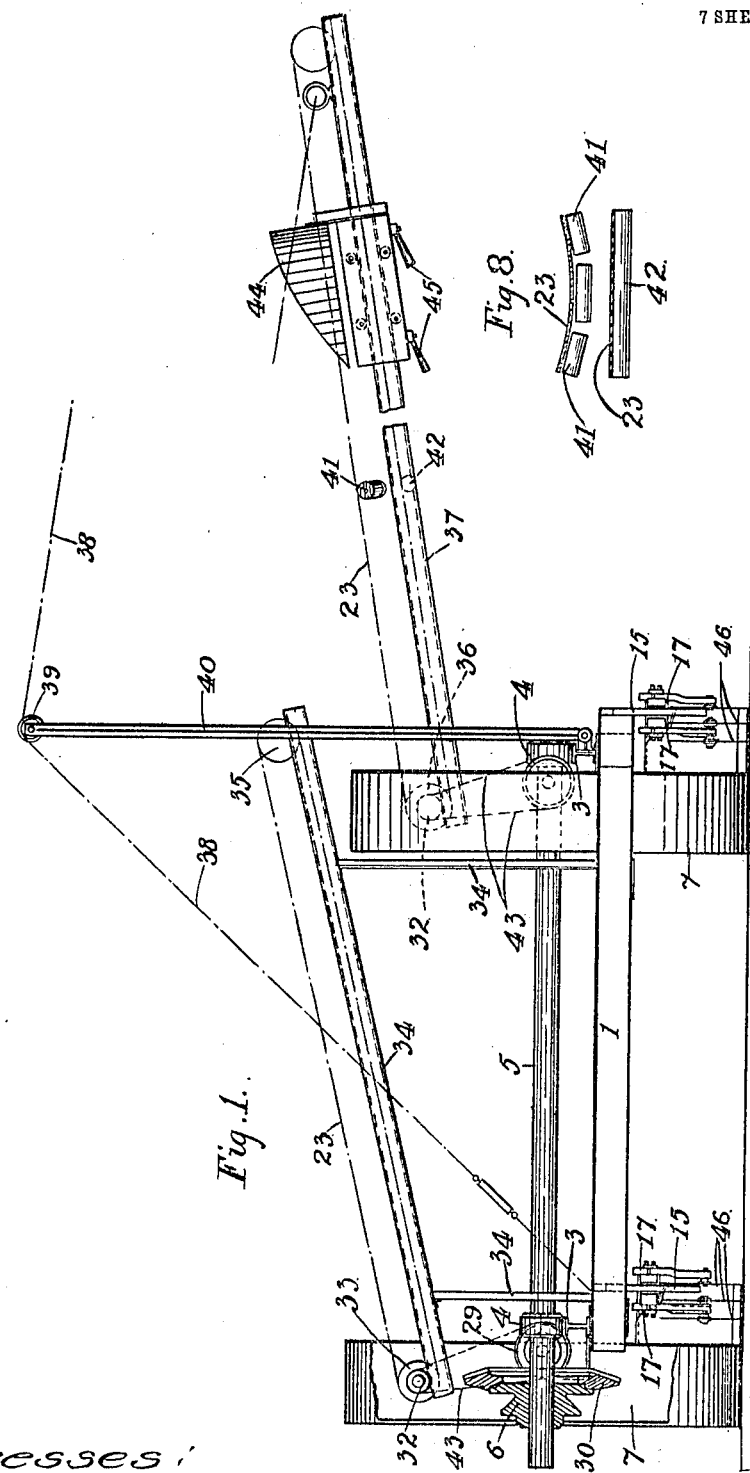
Figure 2:
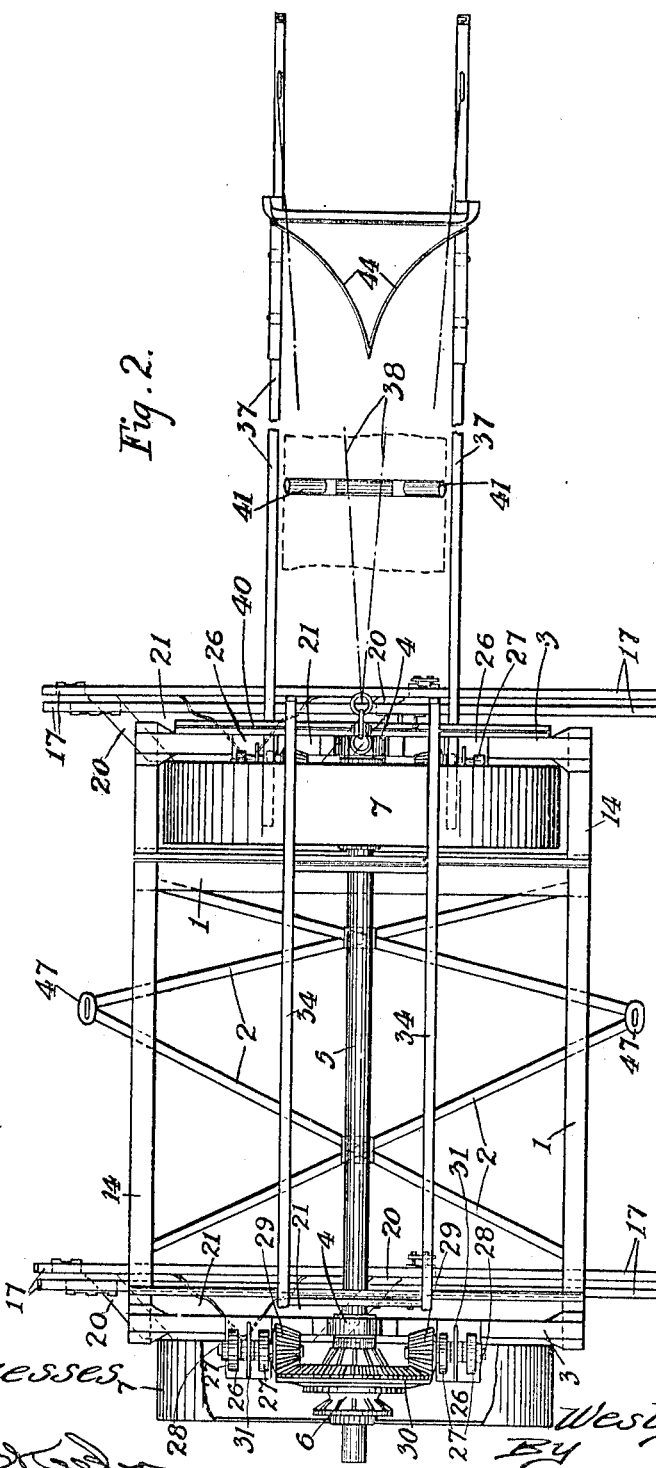
Figure 3:
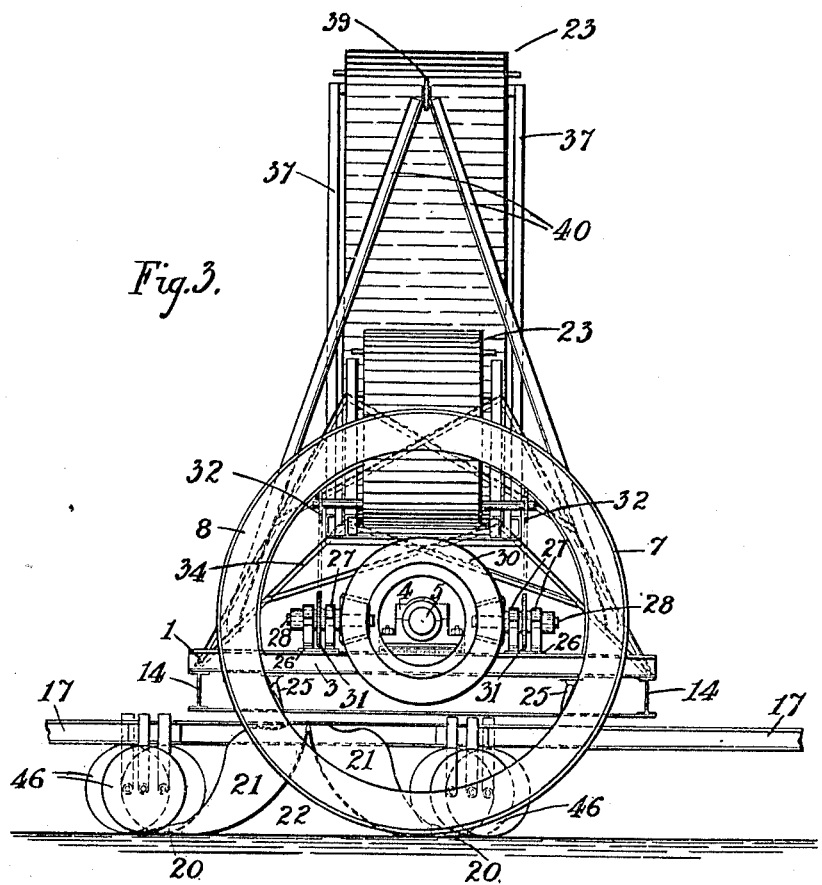

Figure 1 illustrates in front elevation a machine constructed according to my invention. Fig. 2 is a plan view of the machine, while Fig. 3 is a view in side elevation thereof. Figs. 4 to 8 illustrate constructional details of the invention hereinafter described. Fig. 9 is a sectional elevation of a modified form of combined transport and elevating wheel.

In these drawings the reference numeral 1 has been employed to designate a horizontal rectangular framing constructed preferably of girder and channel iron bars strengthened by suitable stays, straps, or rods 2. The side members 3 of the said framing are provided with plumber blocks or similar bearings 4, which are adapted to receive a shaft or axle 5 extending transversely across the center of the framing 1. In the form of construction illustrated in the drawings the ends of the said axle 5 are fitted rigidly within hubs 6 of combined elevating and transport wheels 7, one of which is located on the outside of the horizontal framing on one side, and the other within the framing on the opposite side of the machine. This construction admits of the shaft or axle 5 being driven by means of flexible Cardan shafts from a traction engine, which may also be employed to impart motion to the whole machine and in which latter case the axle 5 may be rigidly fitted to the framing, and the wheels be free to revolve on said axle. The rims of the said wheels 7 are fitted with annular side plates 8 (Figs. 3, 6 and 7) and the space between the said plates on each wheel is formed into buckets or chambers 9 of approved size by radial division plates 10, or the said buckets may be formed integral and secured to the rims of the wheels in any approved manner.

Figure 6:
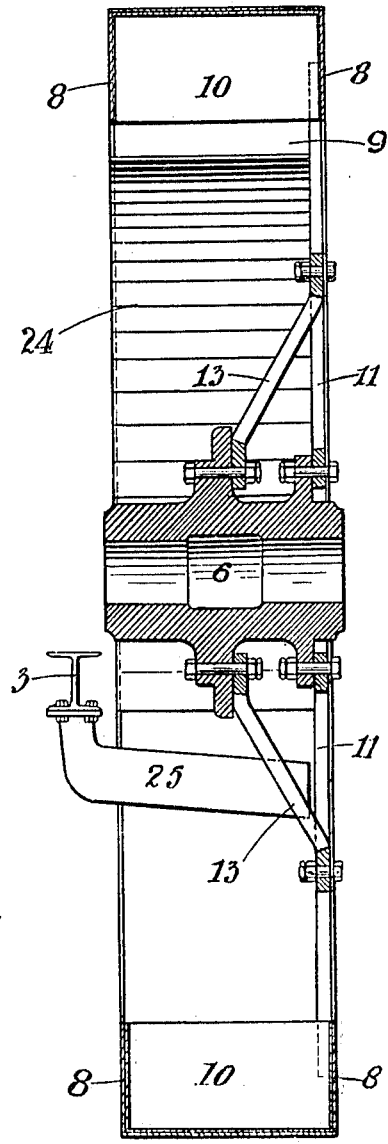
Figure 7:
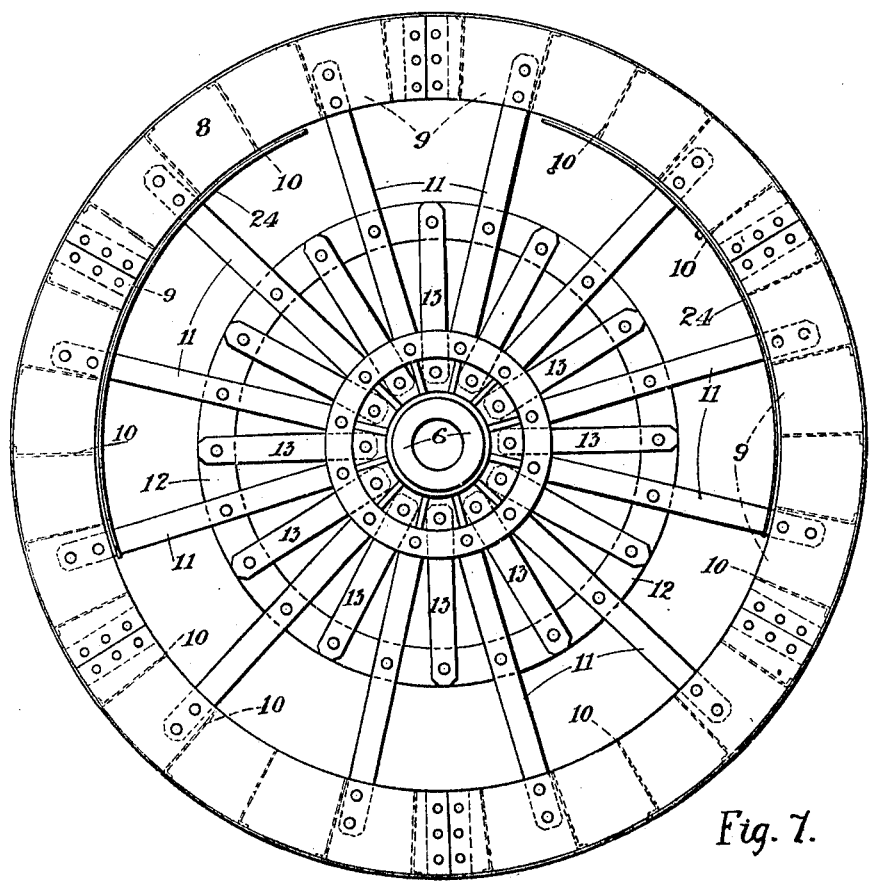

The hubs 6 are connected to the rims of the wheels by means of radial spokes 11, the outer ends of which are riveted or otherwise affixed to that side of the rims farthest from the adjacent side member 3 of the framing 1. Thus the said buckets 9 are arranged to overhang the hubs 6 of the wheels 7 in such a manner as to leave an open space therebetween, which permits of free access being had to the buckets. The said spokes 11 are preferably strengthened by means of rings 12 arranged concentrically with the hubs 6 and radial stays 13 as illustrated in Figs. 6 and 7 of the drawings.

The back and front members 14 of the framing 1 are provided at each end with a depending bracket 15 having a series of holes 16 formed therein, (Figs. 1, 4 and 5) which permit of channel iron beams 17 being adjustably affixed to the brackets 15 at any desired point in the height thereof by means of bolts 18, clamps or the like. The channel iron beams 17 are preferably arranged in pairs, and are located parallel with the side member 3 of the framing as shown. Each pair of these said beams is fitted with two oppositely arranged plow feet 19, which are each furnished with a share 20, and mold-board 21. A land side 22 of sufficient length to extend across and slightly beyond both feet 19 is fitted to the sides of the latter farthest from the adjacent wheel 7, and the extended portions of the said land side 22 prevent the sod elevated by the mold-boards 21 from tipping over to the land side of the plows.

The mold-boards 21 are curved in such a manner that they will direct the cut sod into the center and lowest part of the adjacent wheel to fill the buckets 9 located thereat.

The sods after falling into the interior of the wheels are carried upward to the highest point thereof in the radial buckets 9, and are then discharged therefrom by means of gravitation on to the lower ends of conveyer bands or belts 23. The stems of the plow feet 19 are adjustably fitted to the beams 17 to enable them to be raised or lowered as desired and any suitable form of stay (not shown) can be employed to keep the same rigid when in use. In order to retain the earth within the buckets 9 until they reach the highest point of their travel, stationary curved plates 24 are mounted concentrically inside the said wheels 7 to cover the openings of the said buckets. These curved plates 24 are secured by means of brackets or stays (not shown) to any stationary part of the machine framing, and extend sufficiently far around the inner periphery as to leave openings of suitable size to allow the buckets 9 to be filled and discharged at proper times. Should the sods being tipped into the wheels by the plows more than fill the buckets 9 the superfluous earth projecting above the openings thereof is removed by knives 25 which project laterally from the framing and have their cutting edges located adjacent to the inner periphery of the annular side plates 8. The removal of the superfluous earth by the said knives 25 prevents any undue strain being placed on the retaining plates 24, while the portion removed by the knives gravitates back into the bottom of the wheel and helps to fill the buckets 9 there located. One of these knives 25 is located on each side of both elevating wheels 7 near the lower end of each of the curved retaining plates 24.

The side members 3 of the horizontal framing are each provided with two laterally projecting brackets 26, which extend for a convenient distance within the elevating wheels and support two bearings or plumber blocks 27 of approved design. These bearings 27 are adapted to support short shafts 28 having bevel pinions 29 rigidly mounted on their inner ends, which are adapted to gear with an intermediate and larger bevel wheel 30 affixed concentrically to the hubs 6 of the elevating wheels. Each of these shafts 28 is fitted with a chain or belt wheel 31, which is connected with and designed to impart motion to a similar wheel 32 fitted to the end of the lower conveyer band roller 33 located thereabove. The conveyer band roller 33 located within the outer wheel 7 is mounted on the lower end of a supporting frame 34 constructed of light bar metal, which frame inclines upward and extends slightly beyond the top of the opposite elevating wheel and there supports the opposite conveyer band roller 35. The lower roller 36 of the second conveyer band 23 is located within the near elevating wheel and is supported on the lower end of a pivotally mounted adjustable frame 37. The said frame 37 is supported by flexible stay or guy ropes 38 which pass over a roller 39 affixed to the top of a vertical standard 40 projecting upward from the near side of the machine and are connected at one end to a point near the outer end of the frame 37 and at the other end to a stationary part of the framing 1.

The conveyer bands 23 are preferably made in the form of traveling aprons and the top portions thereof are adapted to travel over one or more series of supporting rollers 41 arranged end-wise and forming a segment of a circle (see Fig. 8). These said rollers 41 besides relieving the conveyer bands 23 of any undue strain, permit of the top or loaded part of the said bands to dish longitudinally with the weight of earth thereon, which dishing effectually prevents the earth from falling over the sides of the conveyer bands. Any approved number of idle rollers 42 are placed under the lower part of the conveyer bands 23 to support and prevent any sagging of the same.

Either of the driving chains 43 on the lower rollers of the conveyer bands 23 may be made inoperative at will by suitable well known mechanism to enable the other to impart the correct movement to the conveyer bands when the machine is traveling in a given direction. An alternate method of attaining the above-mentioned object can be effected by employing only one driving chain and attaching it to either side of the conveyer bands 23 required to impart the necessary movement thereto. A further alternative consists in the employment of flexible shafts fitted preferably with "Hook's" joints for conveying motion to the rollers on the outer ends of the conveyers 23.

The outer conveyer band is considerably longer than that supported on the framing 34 above the machine and while the supporting rollers 41 are used with advantage with the former they may be dispensed with in the latter.

The elevated earth is discharged from the larger conveyer band 23 at any point by means of an ordinary conveyer plow 44 (or tip rollers not shown) which is or are adjustably affixed in any desired position on the frame 37 by means of levers 45.

Figure 4:
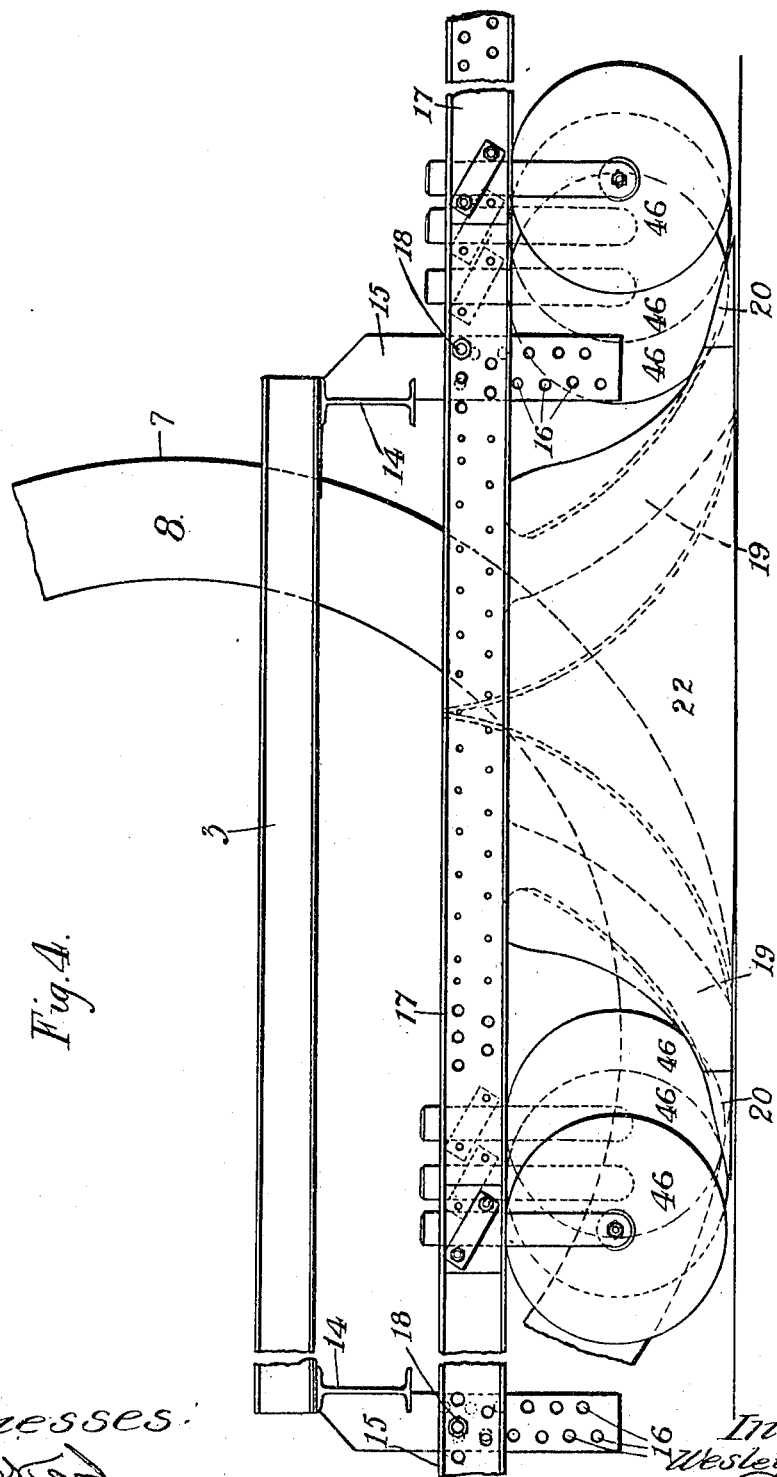
Figure 5:
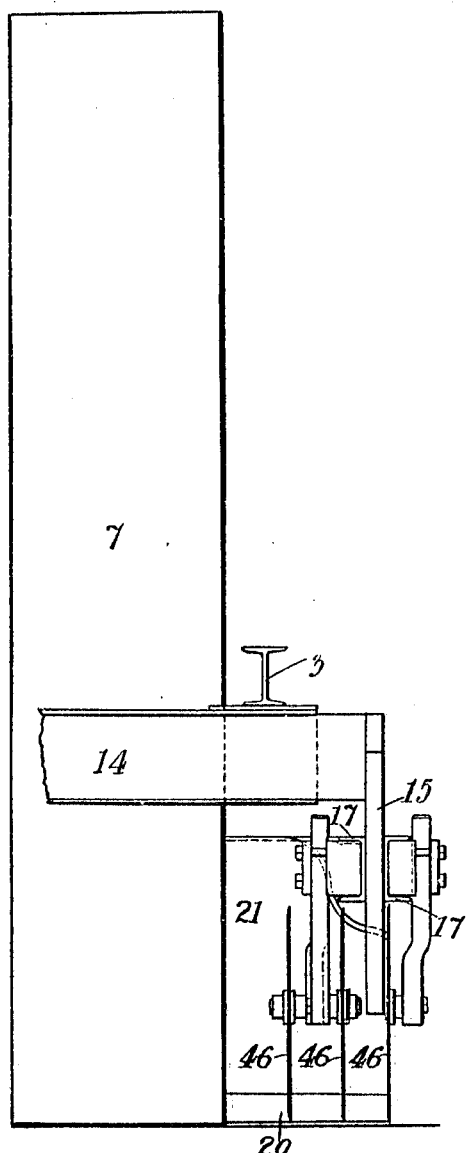

The plow-carrying beams 17 are fitted with three disk colters 46 in advance of each plow share 20, as shown in Fig. 4 of the drawings. The sub-division of the sod by the colters 46 is advantageous in assisting it to pack into the buckets 9 of the elevating wheels and in lessening the draft of the machine when in operation.

When the machine has traversed a required distance in one direction and prior to its return movement, the plow-carrying beams 17 are adjusted so as to bring the opposite plows into their proper position for the return movement. The adjustment of these said beams 17 can be controlled quickly by rack and pinion gearing or other approved mechanism as will be obvious to those skilled in the art.

A modification in the construction of the combined transport and elevating wheel can be effected by making one of the annular side plates 8 considerably broader than the other and giving the inner edge of the former an inward curve, as at 48 see Fig. 9. The broader annular side plate 8 is located on that side of the wheel 7 farthest from the adjacent plow and the inwardly curved portion 48 thereof acts as a chute to direct the earth, gravitating from the top buckets 9, on to the lower end of the adjacent conveyer 23, and also prevents the earth falling down between the back of the wheel 7 and the end of the said conveyer. If preferred an annular plate or disk 49 of thin sheet metal can be secured to the back of the wheel 7 to entirely cover any opening left between the hub 6 and the back plate 8 thereof.

In some cases it may be necessary to provide the machine with trailing and guide wheels, or one of these without the other, but as these additions are of various design and can be applied in a number of different ways to suit particular requirements, they have not been shown therefore in the drawings.

Motion can be imparted to the machine in either direction by means of any approved and well known means, and the haulage chains or ropes can be attached to loops or rings 47 on the stays 2 or to any convenient part of the framing of the machine that is considered most suitable in practice.

In lieu of operating the conveyer bands 23 from the main shaft or axle 5 they can be driven from an oil or other motor attached to the framing of the machine in which case the discharge of the elevated earth would be under independent control and the traction of the machine be considerably lightened thereby.

It will be obvious that as a modification only one elevator wheel 7 and one set of plows could be used, and the opposite side of the framing would then be supported on a suitable traction wheel. The excavated earth in this case would be delivered by a single conveyer band to any point desired. Also it will be equally obvious that three or more elevator wheels with their appurtenant parts could be used in some cases with advantage and the necessary alterations to the structural features would not necessitate the exercise of special skill or invention.

In operation the earth passing up the mold-boards 21 is assisted in its upward movement, by contacting with the face of the adjacent elevator wheel 7, and immediately it reaches a higher level than the annular side plates 8 it tips over into the buckets 9 formed radially in the said wheels. From the higher-most point of the said wheels 7 the earth is deposited on the lower ends of the conveyer bands 23, the shorter one of which delivers on to the larger, from which the earth is deposited as desired, and as hereinbefore explained. The manner of elevating the earth, conveying and dumping it at a required point together with the means of effecting any adjustment of the parts of the invention have been clearly set out in the description hereinbefore contained.

Having now fully described and ascertained my said invention, and the manner in which it is to be performed, I declare that what I claim is:—

1. In a machine of the class described a framing supported on a shaft or axle mounted on one or more combined elevating and transport wheels having inwardly opening buckets or chambers arranged radially on the periphery thereof, double-ended excavating plows designed to deliver earth to said chambers, curved plates secured to the framing and designed to cover chambers on each side of said wheels and knives located below said plates for removing the superfluous earth projecting above the said chambers.

2. In a machine of the class described a construction of combined transport and elevating wheel having inwardly opening buckets or chambers arranged radially on its inner periphery and overhanging the hub thereof, the backs of said buckets or chambers being formed deeper than their fronts and given an inward curve as and for the purposes herein set forth.

3. In a machine of the class described, in combination, a rectangular frame, a shaft extending transversely thereof, combined elevating and traction wheels mounted on the shaft, one of the wheels being located outside of the frame in close association with the adjacent frame side bar and the other traction wheel being located within the frame in close association with the other side bar, the wheels being provided with inwardly opening elevator buckets, means for excavating and deflecting the excavated earth into the buckets, a conveyer extending transversely of the frame and receiving material from the wheel on the outside of the frame, and a conveyer projecting laterally from the frame and receiving material from the wheel within the frame and also from the first-named conveyer.

In testimony whereof I have hereunto set my hand in presence of two subscribing witnesses.

WESLEY CASTLES.

Witnesses:
J. EARLE HERMANN,
G. HAMMOND HUSSEY.